Patented Aug. 1, 1939

2,167,752

UNITED STATES PATENT OFFICE 2,167,752

CASEIN COATING COMPOSITION AND METHOD OF PREPARING THE SAME

Charles G. Harford, Wollaston, Mass., assignor to Arthur D. Little, Inc., Cambridge, Mass., a corporation of Massachusetts No Drawing. Application August 3, 1937, Serial No. 157,147

6 Claims. (Cl. 134—50)

This invention relates to smooth viscous casein coating compositions and the like, and to methods of making them.

This application is, in part, a continuation of my co-pending application Serial No. 105,081, filed October 10, 1936, for Buttermilk casein solution.

It is an object of this invention to manufacture casein vehicles which are suitable for use in the preparation of coatings, such as water paints, and to manufacture stable coating compositions from these vehicles.

Another object is to dispense with the necessity for using solvents or swelling agents in the preparation of such compositions.

A further object is to provide stable casein coating compositions which, when dried, are more resistant to moisture than are the conventional types of these coatings wherein solvents and/or swelling agents are used in their preparation.

Still another object is to utilize the solids of buttermilk in the preparation of casein compositions of the type herein described.

Other objects will appear from the following disclosures.

In the past, the preparation of casein compositions for use in making paints, coatings, finishings, etc., was generally accomplished by taking dried casein, which had been prepared from skim milk by any one of a number of processes, and treating this dried casein with an alkali or alkaline substance to put it into solution. The resulting solutions were distinctly alkaline, and were subject to physical and chemical changes which made them unfit for use after the passage of a relatively short time (a few days, generally, or sometimes hours). In recent years, however, the work of Atwood, Iddings, and Regnier, as described in U. S. Patents Nos. 1,506,081, 1,893,608, 2,023,389, and others has resulted in the development of acidic casein compositions which, when suitable materials of a bactericidal and fungicidal nature are included, retain their stability over long periods of time.

The casein compositions as prepared in accordance with the present invention are of this latter general type—i. e., they are stable, viscous dispersions or solutions, and are slightly acidic, having a pH range of between 4.6 and 7.0 (which values are respectively the isoelectric point for casein and exact neutrality); or they may have a pH value as high as 9 or thereabouts if properly buffered.

This invention, however, distinguishes from conventional acidic casein compositions of the above-described type in a number of ways, and possesses certain advantages over them, as will now be pointed out.

In carrying out this process, the casein used as the starting material should be wet or moist, and should not have been reduced to dry form at any stage in its manufacture from the original source (skim milk, buttermilk, whole milk, etc.). By being thus kept wet or moist, the casein remains in substantially the same swollen and dispersed state in which it occurred in the original milk. Therefore, I find it unnecessary to add swelling agents, as the casein is already swollen; also, I find it unnecessary to add solvents, which would be required if the casein were in dry form.

By this process, it is therefore possible to eliminate the conventional step of first drying the casein. The cost of swelling agents and/or solvents is also avoided. And as a result of this procedure, it is possible to make a casein coating composition which, when dried, is more resistant to moisture than conventional casein compositions using solvents and/or swelling agents, as these latter substances, being necessarily present in the conventional product, retain their potential solvent and /or swelling properties which become manifest when the product is subjected to moisture.

A further advantage of the present invention lies in the fact that it is suitable for preparing compositions of the type described from the casein obtained from buttermilk. This is of particular importance, owing to the fact that such casein, while available in large quantity, has been hitherto of little commercial value. At present, buttermilk is a by-product having little use, being commonly employed either as a source of feed for stock, or even discarded as worthless. This is especially true with buttermilk from sour cream, which is the source of the great bulk of buttermilk made.

The solids obtained from buttermilk in the manner herein described differ from ordinary casein in having appreciable quantities of associated materials present, more especially albumen, and fats and fat-like substances including lecithin. The fats and fat-like substances are of various types, but all come under the general term "lipoids," which will be used hereinafter to designate them. Lipoids are the mixture of fats, substances of fat-like nature such as lipins, and other substances obtained in the Roese-Gottlieb extraction procedure (see "Official and Tentative Methods of Analysis of the Association of Official Agricultural Chemists,"

4th ed.). Lipins are substances of a fat-like nature yielding on hydrolysis fatty acids or derivatives of fatty acids, and containing in their molecule either nitrogen or nitrogen and phosphorus. They include the phospholipins, such lecithin, cephalin, and sphingomyelin, and the galactolipins or cerebrosides (see "Lecithin and Allied Substances" by Hugh & J. S. MacLean, 2nd ed., p. 3). The terms "buttermilk solids", "buttermilk casein" and "casein from buttermilk," as used herein, refer to the true casein together with these associated materials—the lipoids, albumen, and also the ash. The buttermilk casein does not necessarily contain all or even a major portion of the albumen and lipoids present in the original milk, but it does contain significant amounts of them, as indicated below, whereas ordinary commercial caseins do not.

The successful commercial utilization of caseins relatively high in albumen and lipoids has not hitherto been accomplished, so far as I am aware. Caseins of this type, typically those obtained from buttermilk, contain at least about 4 or 5% lipoids (as determined by the Roese-Gottlieb method), as compared with between 0.5% and 2% in ordinary caseins. They also ordinarily contain significant amounts of albumen, up to about 10%. Ordinary caseins now commercially used have amounts of albumen, lipoid, etc.) too small to be of any significance. With casein of the type obtained from buttermilk, however, these constituents have hitherto been a serious drawback to utilization. Thus, albumen, when precipitated by heating, is an irreversible colloid which, on drying, becomes dehydrated. By the term "albumen" I include as well other albuminous and protein materials in the buttermilk which act in the manner here defined with respect to albumen. In this dehydrated form (which is obtained when buttermilk casein is dried in the course of customary procedure) it is impractical to adequately rehydrate and redisperse the albumen at the pH values set forth herein, even when solvents and/ or swelling agents are used. If the albumen is kept wet, as during pasteurization, ordinary heating (say to 180° F.) does not markedly dehydrate it, although heating does precipitate and more or less denature it. In the precipitated wet state, however, the albumen is swollen, and is useful in the present process, which is not true if the albumen is dried after heat precipitation. Since I maintain the buttermilk solids obtained as herein described in a wet condition until after the final composition is formed, and the said solids may or may not have been through a pasteurization process, the difficulties caused by dried albumen are avoided, and the albumen present provides certain advantages, such as improved water resistance of the final dried product.

If desired, albumen and/or lipoids may be added to the solids from skim milk, or even those from buttermilk, to give a high-albumen and/or high-lipoid casein which may be treated in accordance with the present invention.

While this invention, as already stated, is applicable to casein from milk whether whole, skim, or buttermilk, to give good and useful products, casein with associated solids, typically those solids associated with casein from buttermilk, impart certain additional qualities to the product which are not present when using ordinary dried casein. Thus, coating materials prepared as herein described, using casein and associated solids typically from buttermilk, are superior to those prepared from ordinary dried casein in their flowing and leveling (brushing) qualities (i. e., they spread more easily), in their resistance to foaming during preparation, and in their resistance to moisture when dried. The fats and fat like substances or lipoids retained in the product do not tend to separate out and appear on the surface, as would be expected from past experiences. The presence of the albumen appears to increase the water resistant character of the product.

In carrying out this invention, the casein and associated solids from skim milk, buttermilk, or other milk source are obtained by conventional procedure, as by acid precipitation (e. g., self-souring, added acid, etc.). The liquid (whey) is separated from the precipitate, as its presence would be detrimental to the final product. The liquid to solids ratio is then adjusted to any suitable degree for making coatings—say about 4 or 5 to 1 for paint vehicles (which are customarily subsequently diluted). This adjustment may be made after the usual washing of the precipitate, or with a wash water, or otherwise as desired.

The process preferably comprises the acid precipitation, as by self-souring, of the casein and associated solids from buttermilk obtained from previously pasteurized cream. Albumen is thus obtained along with the casein and other associated solids such as the lipoids. The solids are kept in a wet state at all times. In this way, the defects heretofore associated with buttermilk casein products are overcome and a superior coating composition is obtained.

If swelling agents and/or solvents are to be added in preparing the composition of this invention, it is desirable to heat the mixture containing them and the casein and water in order to promote the action of these solvents or swelling agents. About ½ to ¾ hour of heating at say 150°–160° is sufficient. While the solvents may contribute somewhat to ensuring a smooth composition, and both the swelling agents and the solvents to ensuring the desired viscosity, either or both may be dispensed with, as already stated, without any significant detriment to the product and in fact with certain advantages already pointed out.

If a swelling agent is used, any of the customary materials such as sodium acetate, sodium formate, lithium chloride, etc., may be employed. As solvents, many alkalies are known and suitable, e. g., borax, trisodium phosphate, and various soaps and organic amines—or a strong alkali followed by a mild acid.

Whatever procedure is followed—whether or not swelling agents and/or solvents are used— the resulting casein composition as prepared should have a pH lying between the isoelectric points for casein and water—i. e., between 4.6 and 7.0. When no solvents or swelling agents are used, the pH should be adjusted to fall within this range, if not already in it, but ordinarily it is. A higher pH (above 7.0) will result in a composition subject to the objections generally of the hitherto used alkaline casein solutions, unless proper buffering is done, as will be described hereinafter. On the other hand, a pH below 4.6 has a tendency to agglomerate the casein and give an unsuitable product.

To make the casein paint or coating, the vehicle produced as above described is thoroughly mixed with a suitable pigment. Thus, for making a white paint, "Titanox" (titanium dioxide pigment) may be added to the casein composition and passed, for example, through a conventional paint mill, whereupon it is ready for use. This thorough mixing with pigments acts to smooth out and homogenize the final coating composition. Without such thorough mixing, the resulting coating composition will not be smooth enough for most practical applications. It appears that the particles of the pigments act, while being mixed, to grind and homogenize the solids of the vehicle, thus producing a coating composition of the desired smoothness and uniformity.

As one specific example of my procedure, the following will serve, using neither solvent nor swelling agent:

*Vehicle*

| | Pounds |
|---|---|
| Casein paste to give solid content on bone dry basis of | 100 |
| Enough water to give total water content of | 500 |
| Pine oil | 8 |
| Fish oil | 40 |

*Pigments*

| | Pounds |
|---|---|
| Lithopone | 490 |
| Asbestine | 180 |

As another example, using a solvent, take the preceding example and add 8 lbs. borax in preparing the vehicle.

As another example, using a swelling agent, take either of the preceding examples and add 10 lbs. sodium formate in preparing the vehicle.

The ingredients of the vehicle, in any of the examples, are mixed together, and, if swelling agents and/or solvents are used, the mixture is heated—at say 150°–160° F. for about ¾ hour— and then cooled to ordinary temperature. Heating is not necessary if no swelling agents or solvents are used. The pigments (white, in this instance, although colored pigments are used if desired) are then added, and thoroughly mixed with the vehicle. In the final product, the casein solids should generally equal about 12% to 15% of the pigment solids, for best results. The product may be diluted, if desired, before application.

The fish oil acts as a plasticizer. Other plasticizers may be used if desired. The pine oil imparts an agreeable odor, and also tends to serve as a bactericide. If it is desired to keep the paint over long periods of time, say for several months, a more effective egent such as sodium phenyl phenate, may be added, to act as both bactericide and fungicide.

There are two types of decomposition or deterioration from which casein compositions of the kind herein described must be protected if they are to be kept for any length of time,— growth of bacteria and fungi, and proteolysis. The former is prevented by a preservative; the latter (at least in its ammonolysis aspects) by preparing the composiiton at a pH not in excess of 7.0. Prevention of these kinds of deterioration should be accomplished with respect to the original casein before preparation of the compositions herein described, if said casein is to be kept for any length of time before it is used. This is, obviously, accomplished by pH control and the use of a bactericide and fungicide.

A modification of the present process has already been suggested—namely the preparation of coating compositions having a pH value on the slightly alkaline side of neutrality. It is customarily held that casein solutions which are on the alkaline side of neutrality will readily deteriorate and become unfit for use in a relatively short time,—even if bactericides and fungicides are used,—because of ammonolysis. I find, however, that by properly buffering the casein coating solutions, prepared otherwise in accordance with this invention, I may make such solutions with a pH value up to about the point where substantial ammonolysis takes place and ammonia is given off,—that is, in the neighborhood of pH=9 or somewhat higher. Furthermore, these compositions are thoroughly stable and have all the other desirable characteristics of those made in accordance with this invention at pH values below 7. Buffered solutions are those which tend to resist changes in pH value even when small amounts of acids or alkalies are added. By preparing my solutions buffered, at pH values not in excess of about 9, I can make a casein coating composition which is on the alkaline side (e. g., with a pH value of say 8 or 9) but which, due to buffer action, resists any increase of pH value to the point where substantial ammonolysis takes place. In the past, alkaline casein solutions made at pH=8 or 9 or thereabouts would become progressively more alkaline with the passage of time, until substantial ammonolysis took place, with decomposition of the solutions.

The buffer may be a separate agent, and added when the pigments are added or at any other desired time; or it may be the pigment itself. Thus, in the former procedure, a solution of boric acid and sodium hydroxide in the approximate weight-ratio of 3 parts of the former to one of the latter, may be added; while in the latter procedure, a pigment such as lithopone, used as in the example already given, is a suitable buffer and tends to maintain the pH value definitely within the desired range.

Except for this use of buffers with the consequent ability to prepare a solution having a pH value above 7 up to any point below that at which substantial ammonolysis takes place, my procedure for this modification is exactly the same as that previously described herein for preparing casein coating compositions and vehicles having pH values between 4.6 and 7.0.

While the preferred embodiment of the inventin is disclosed herein, it should be understood that this is by way of example and that I am limited only by the scope of the appended claims.

I claim:

1. The method of converting buttermilk casein and some of its accompanying solids into a smooth viscous liquid coating composiiton which consists in precipitating said casein and carrying down the precipitated casein and the accompanying solids, including lipoids in the proportions of about 4% or more of lipoids to 100% buttermilk casein, from their original accompanying whey, then adding an alkaline casein dissolving agent in sufficient quantity to produce a solution with a pH of above 7, thoroughly mixing said vehicle in its wet state with pigments in the presence of a buffer substance acting to maintain a pH value below that at which substantial ammonolysis takes place, and maintaining enough water with the solids to prevent drying thereof until the final coating composition is completed.

2. The method of converting buttermilk casein and some of its accompanying solids into a smooth viscous liquid coating composition which consists in precipitating said casein and carrying down the precipitated casein and the accompanying solids, including lipoids in the proportions of about 4% or more of lipoids to 100% buttermilk casein, from their original accompanying whey, then adding an alkaline casein dissolving agent in sufficient quantity to produce a solution with a pH of above 7, thoroughly mixing said vehicle in its wet state with pigments in the presence of a buffer substance comprising a solution of boric acid and sodium hydroxide acting to maintain a pH value below that at which substantial ammonolysis takes place, and maintaining enough water with the solids to prevent drying thereof until the final coating composition is completed.

3. The method of converting buttermilk casein and some of its accompanying solids into a smooth viscous liquid coating composition which consists in precipitating said casein and carrying down the precipitated casein and the accompanying solids, including lipoids in the proportions of about 4% or more of lipoids to 100% buttermilk casein, from their original accompanying whey, then adding an alkaline casein dissolving agent in sufficient quantity to produce a solution with a pH of about 7, thoroughly mixing said vehicle in its wet state with pigments in the presence of a buffer substance comprising lithopone acting to maintain a pH value below that at which substantial ammonolysis takes place, and maintaining enough water with the solids to prevent drying thereof until the final coating composition is completed.

4. A smooth stable viscous liquid coating composition having a pH above 7 and below 9, comprising the reaction product of acid precipitated undried buttermilk solids including casein, albumen, and at least 4% lipoids, an alkaline casein dissolving agent and a buffer substance, reacted together while the casein is in the undried state.

5. A smooth stable viscous liquid coating composition having a pH above 7 and below 9, comprising the reaction product of acid precipitated undried buttermilk solids including casein, albumen, and at least 4% lipoids, an alkaline casein dissolving agent and a buffer substance comprising lithopone, reacted together while the casein is in the undried state.

6. A smooth stable viscous liquid coating composition having a pH above 7 and below 9, comprising the reaction product of acid precipitated undried buttermilk solids including casein, albumen, and at least 4% lipoids, an alkaline casein dissolving agent and a buffer substance comprising a solution of boric acid and sodium hydroxide, reacted together while the casein is in the undried state.

CHARLES G. HARFORD.